United States Patent
Harley et al.

(10) Patent No.: US 7,197,243 B1
(45) Date of Patent: Mar. 27, 2007

(54) OPTICAL WAVEFORM FOR USE IN A DWDM OPTICAL NETWORK AND SYSTEMS FOR GENERATING AND PROCESSING SAME

(75) Inventors: James Harley, Ottawa (CA); Lacra Pavel, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/539,706

(22) Filed: Mar. 31, 2000

(51) Int. Cl.
*H04B 10/08* (2006.01)

(52) U.S. Cl. .............................. 398/32; 398/33; 398/193
(58) Field of Classification Search ................... 398/32, 398/33, 193, 199
See application file for complete search history.

(56) References Cited

U.S. PATENT DOCUMENTS

| | | | |
|---|---|---|---|
| 4,831,662 A | | 5/1989 | Kuhn |
| 4,926,429 A | * | 5/1990 | Chung ......................... 372/32 |
| 5,513,029 A | | 4/1996 | Roberts ....................... 359/177 |
| 5,745,274 A | * | 4/1998 | Fatehi et al. ................ 398/198 |
| 5,798,858 A | * | 8/1998 | Bodeep et al. .............. 398/194 |
| 5,859,716 A | * | 1/1999 | O'Sullivan ................... 398/17 |
| 5,969,840 A | | 10/1999 | Roberts |
| 6,128,111 A | * | 10/2000 | Roberts ....................... 398/29 |
| 6,445,478 B2 | * | 9/2002 | Shimizu et al. ............. 398/192 |
| 6,483,617 B1 | * | 11/2002 | Roberts ....................... 398/29 |

FOREIGN PATENT DOCUMENTS

| | | |
|---|---|---|
| EP | 0 782 279 A2 | 7/1997 |
| EP | 0 849 893 A2 | 6/1998 |
| EP | 0 959 579 A2 | 11/1999 |

OTHER PUBLICATIONS

European Search Report EP 01 30 2956, Sep. 10, 2003.

\* cited by examiner

*Primary Examiner*—Dzung Tran
(74) *Attorney, Agent, or Firm*—Jeffrey M. Measures; Borden Ladner Gervais LLP (57) ABSTRACT

An optical signal occupying one or more wavelengths. An optical data signal on each wavelength is modulated with a respective overhead (dither) signal, resulting in a respective dithered optical signal. The amplitude of a particular overhead signal used to modulate the corresponding optical data signal is chosen so that the RMS value of the overhead signal in the dithered optical signal is proportional to the average intensity of the optical data signal. The instantaneous frequency of each overhead signal is time-varying and each possible frequency belongs to a distinct set of frequencies which are all harmonically related to a fundamental frequency. The distinctness of each set of frequencies allows each overhead signal to be uniquely isolated from an aggregate overhead signal. The harmonic relationship among the frequencies allows improved accuracy of RMS detection at a receiver as well as reduced computational complexity, as each possible frequency for each overhead signal can be made to fall at the center of one of the frequency bins of a single FFT of reasonable size performed at a receiver. Methods and systems for generating and detecting such signals are disclosed.

31 Claims, 4 Drawing Sheets

OPTICAL WAVEFORM FOR USE IN A DWDM OPTICAL NETWORK AND SYSTEMS FOR GENERATING AND PROCESSING SAME

FIELD OF THE INVENTION

The present invention relates generally to dense wavelength division multiplexed (DWDM) optical networks and, in particular, to optical waveforms used in such networks and to systems used for generating and decoding such waveforms.

BACKGROUND OF THE INVENTION

In a dense wavelength division multiplexed (DWDM) optical network, an aggregate optical signal travelling on a single optical fiber occupies multiple wavelengths, each of which carries a respective high-speed optical data signal. Although they may travel together along multiple spans throughout the network, the individual optical data signals carry information that is independent and is associated with its own source and destination network elements.

It is often desirable for a downstream network element in a DWDM network to have knowledge of the average intensity of the optical data signal occupying each wavelength. This is to allow the network element to initiate control functions such as amplifier gain adjustment and protection switching in a timely fashion. In order to keep costs to a minimum, it is desirable for the downstream network element to have access to the intensity information at multiple wavelengths without having to resort to wavelength demultiplexing and conversion of multiple (possibly hundreds of) optical signals into electrical form.

A solution to this problem for low density wavelength division multiplexed optical networks is described in U.S. Pat. No. 5,513,029 to Roberts et al., issued on Apr. 30, 1996, assigned to the assignee of the present invention and hereby incorporated by reference herein in its entirety.

In accordance with U.S. Pat. No. 5,513,029, a transmitter first modulates the optical data signal on each wavelength with a respective dither signal of a certain amplitude. The dither signals are described as being pseudo-random noise (PN) sequences which are distinct for each wavelength. The transmitter then measures the modulation depth of each individual resultant signal after modulation with the corresponding dither signal and adjusts the amplitude of the dither signal until a known "modulation depth" is achieved. (The "modulation depth" is commonly defined as the root-mean-square (RMS) value of the dither signal divided by the average intensity of the optical data signal being modulated.)

Thus, a receiver located at a downstream network element can estimate the average intensity of the optical data signal at multiple wavelengths of an incoming optically multiplexed signal by: (a) tapping a portion of the multiplexed signal using an inexpensive optical coupler; (b) converting the tapped optical signal to electrical form; (c) low-pass filtering the electrical signal to provide an aggregate dither signal; (d) separating the dither signals by matching them with known PN sequences; (e) measuring the RMS value of each dither signal; and (f) dividing the RMS value of each dither signal by the known modulation depth.

Unfortunately, the system disclosed in U.S. Pat. No. 5,513,029 has several drawbacks, which either cause the system to have poor performance or make the system prohibitively complex to implement, or both. This is especially true in the context of a dense WDM network, where there may be hundreds of optical carriers sharing a relatively narrow portion of the electromagnetic spectrum.

For example, in order to achieve good performance at the receiver, the RMS value of each dither signal present in the aggregate dither signal must be determined to a high degree of accuracy. Of course, this can only occur if the receiver accurately detects the presence of each dither signal in the aggregate dither signal. If the individual dither signals are PN sequences (as per U.S. Pat. No. 5,513,029), then in order to achieve the requisite degree of accuracy, the receiver must sample the aggregate dither signal at the center of the "chip period" of each PN sequence.

However, because the dither signals are generated on an independent basis, possibly by sources located at different parts of the network, there will generally be phase offsets among the dither signals contained in the aggregate dither signal. Therefore, in order to compensate for such differences in phase, the sampling rate used at the receiver must be much higher than the chip rate. It is therefore apparent that there exists a trade-off between sampling precision (leading to accurate RMS estimates and hence accurate estimates of average intensity) and computational simplicity.

The problem is no less severe if the dither signals used for different optical wavelengths occupy different frequencies rather than different PN sequences. In this case, the step of distinguishing the various dither signals would involve passing the aggregate dither signal through a parallel array of filters, one for each wavelength. As the number of wavelengths (and filters) increases, the bandwidth of each filter will have to be decreased in order to allow only the desired dither signal to pass through to the RMS detection stage, with the effect of deleteriously increasing the filter design complexity.

Moreover, it has been observed that framing of an optical data signal at 8 kHz causes the appearance of spurious frequency lines at multiples of 8 kHz in the frequency spectrum of the optical data signal. If such lines fall within the bandwidth of one or more of the filters, then it is apparent that the RMS value estimated as a function of each such filter's output will be biased. In a more general case, e.g., where the optical data signal is asynchronous, it may be impossible to predict the location of spurious frequency contamination, with the end result being the production of randomly biased RMS estimates.

Clearly, it would be a huge advantage to provide a system which is capable of estimating the average intensity of an optical signal at each of one or more wavelengths with reasonable accuracy and low computational complexity.

SUMMARY OF THE INVENTION

The invention is directed to providing a method and system for estimating the average intensity of an optical signal at each of one or more wavelengths with sufficiently high accuracy and sufficiently low computational complexity.

In the present invention, the optical data signal on each wavelength is modulated with a respective overhead (dither) signal, resulting in a respective dithered optical signal. The amplitude of a particular overhead signal used to modulate the corresponding optical data signal is chosen so that the RMS value of the overhead signal in the dithered optical signal is proportional to the average intensity of the optical data signal. The instantaneous frequency of each overhead signal is time-varying and each possible frequency belongs to a distinct set of frequencies which are all harmonically related to a fundamental frequency.

The distinctness of each set of frequencies allows each overhead signal to be uniquely isolated from an aggregate overhead signal. In this way, one avoids having to perform optical demultiplexing of the individual dithered optical signals at a receiver in order to extract the individual overhead signals. Furthermore, the harmonic relationship among the frequencies allows improved accuracy of RMS detection at a receiver as well as reduced computational complexity, as each possible frequency for each overhead signal can be made to fall at the center of one of the frequency bins of a single FFT of reasonable size performed at a receiver.

According to one embodiment of the invention, there is provided an optical signal with light occupying at least one wavelength, where the light on each wavelength has an intensity that is pulse modulated by a respective optical data signal and amplitude modulated by a respective overhead signal. The overhead signal has an RMS value that is a function of an average intensity of the respective optical data signal and further having an instantaneous frequency content that is time-varying. The invention further provides that the instantaneous frequency content of each overhead signal is uniquely associated with the respective wavelength and also that the instantaneous frequency content of each overhead signal is harmonically related to a common fundamental frequency.

The number of wavelengths is usually at least two and is much larger in a dense system. The RMS value of each overhead signal may be proportional to the average intensity of the respective optical data signal. Variations of the frequency content of at least one overhead signal may encode control information. The combined frequency content of each overhead signal may span a frequency range between 300 kilohertz and 1 megahertz.

According to another embodiment of the invention, there are provided a method and system for generating a dithered optical signal, including the steps of intensity modulating an optical carrier modulated data signal in accordance with an overhead signal to produce the dithered optical signal, measuring a modulation depth of the dithered optical signal and adjusting the amplitude of the overhead signal as a function of the measured modulation depth. The overhead signal has an instantaneous frequency content which is time-varying and is uniquely associated with the optical wavelength of the carrier, wherein the instantaneous frequency content is selected from a set of frequencies which are harmonically related to a common fundamental frequency.

According to still another embodiment of the invention, there is provided a method of generating first and second dithered optical signals, each of which is generated according to the above described method. In this embodiment, it is required that the frequency content of the first and second overhead signals be harmonically related to a common fundamental frequency. The first dithered optical signal may be optically coupled to the second dithered optical signal.

According to yet another embodiment of the invention, there are provided a method and system for determining the average intensity of at least one optical data signal generated in a received optical signal having been according to any method which ensures that each optical data signal occupies a respective wavelength of interest and has an intensity that is amplitude modulated by a respective overhead signal having an instantaneous frequency content that varies with time.

In this embodiment, the method includes the steps of transforming the received optical signal into an aggregate signal in electrical form, transforming the aggregate signal into a frequency domain vector and, for each wavelength of interest:

(a) correlating the frequency-domain vector with a plurality of harmonically related frequency-domain templates to produce plural correlation results, the templates being uniquely associated with the wavelength of interest;

(b) processing the plural correlation results to produce a candidate frequency and a candidate RMS value; and (c) validating the candidate frequency and the candidate RMS value.

The step of transforming the aggregate signal into a frequency-domain vector may include sampling the aggregate electrical signal and executing a fast Fourier transform (FFT) on a finite number of samples, to produce the frequency-domain vector. The method may include the intermediate steps of acquiring the samples over an integer number of blocks each having a length substantially equal to the inverse of the fundamental frequency, summing each block of windowed samples on an element-by-element basis to produce a block of summed elements and dividing each summed element by the integer number.

BRIEF DESCRIPTION OF THE DRAWINGS

These and other aspects and features of the present invention will now become apparent to those of ordinary skill in the art upon review of the accompanying description of specific embodiments of the invention in conjunction with the following drawings, in which.

DETAILED DESCRIPTION OF THE PREFERRED EMBODIMENTS

Figure 1:
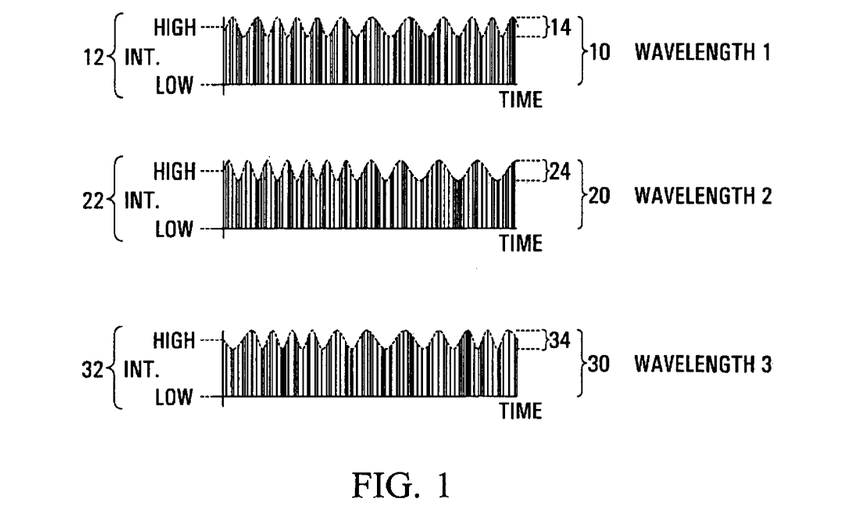
FIG. 1 is a time-domain, per-wavelength depiction of a waveform that carries control information in accordance with a specific embodiment of the present invention.

Reference is first made to FIG. 1 which shows a plurality of dithered optical signals 10, 20, 30 that are carried on respective distinct wavelengths by a common optical transmission medium (e.g., an optical fiber or silica waveguide). In an actual DWDM network, there may be up to several hundred such dithered optical signals sharing the same optical fiber. Each of the dithered optical signals 10, 20, 30 consists of light which has been twice modulated, once by a stream of data pulses and another time by an overhead signal.

Specifically, each of the dithered optical signals 10, 20, 30 is made up of a respective one of a plurality of high-speed (e.g., 10 Gbps) optical data signals 12, 22, 32, each of which is typically binary pulse modulated light that represents a logic zero when it has a low intensity and a logic one when it has a high intensity. The desired intensity of the light at the low intensity is typically the same for all the optical data signals 12, 22, 32 while the desired intensity of the light at the high intensity will be different, depending on the optical power with which the respective optical data signal is transmitted.

Each of the optical data signals 12, 22, 32 is further amplitude modulated at its source by a respective one of a plurality of low-frequency overhead signals 14, 24, 34. The amplitude of each overhead signal is chosen such that the modulation depth (i.e., the ratio of the RMS value of the overhead signal to the average intensity of the corresponding optical data signal) is equal to a known value. This allows an eventual downstream network element to obtain, inferentially, the value of the average intensity of each optical data signal simply by measuring the RMS value of the corresponding overhead signal and multiplying it by the known modulation depth.

According to the invention, each of the overhead signals 14, 24, 34 offers frequency diversity in order to provide immunity against, for instance, framing of the optical data signals at 8 kHz. To this end, the control channel employs frequency shift keying (FSK) having a relatively small number of frequency possibilities, which also keeps the receiver complexity at a relatively low level.

The frequency of each overhead signal can thus be changed on a regular basis to provide frequency diversity. Alternatively, the frequency of each overhead signal can be changed in accordance with control information, thereby causing the overhead signal to serve as a low bit rate "control channel". The control information could include connectivity information, such as the address of the source transmitter and/or the bit rate (e.g., OC-48, OC-192) and/or format (e.g., SONET, SDH) of the corresponding optical data signal. Further examples of useful control information may be found in co-pending U.S. Patent application Ser. No. 09/199,327 of Harley et al., filed Nov. 25, 1998, assigned to the assignee of the present invention and incorporated by reference herein.

Thus far, the bit rate of each control channel, the number of frequency possibilities for each overhead signal and possible values for the frequencies themselves have not been discussed. Regarding the bit rate of each control channel and the number of frequency possibilities for each overhead signal, these should be sufficiently low in order to avoid interference of a particular overhead signal with the corresponding optical data signal and also to avoid causing wild excursions of the resulting dithered optical signal.

One example of a suitable bit rate for the control channel at a given wavelength is 2 bits per second and one example of a suitable number of frequency possibilities is 8. Given these two parameters, the minimal interval between changes to the frequency content of the overhead signal will be 1.5 seconds. Of course, other bit rates and other numbers of frequency possibilities are possible.

The issue of possible frequency values is now discussed. Firstly, it should be recognized that although the various overhead signals 14, 24, 34 occupy different wavelengths, the corresponding multiple dithered optical signals 10, 20, 30 travel together on the same fiber and therefore the overhead signals will all be combined into a single aggregate overhead signal if a single optical tap coupler is used at a downstream receiver.

In order to prevent the overhead signals 14, 24, 34 from interfering with one another when they are combined into the aggregate overhead signal, it is necessary to ensure their orthogonality. This can be achieved by assigning a unique set of frequencies to each overhead signal, with each set being uniquely associated with the wavelength of the corresponding optical data signal. Thus, each overhead signal is only allowed to occupy frequencies from an assigned set.

Next, it should also be recognized that a mere random assignment of distinct frequencies for each set will result in prohibitively complex receiver equipment, insofar as sampling the overhead signals, decoding the connectivity information and estimating the average optical intensity at each wavelength are concerned. To achieve advantages related to receiver simplification, the present invention requires that all the frequencies used for all the overhead signals be harmonically related to a common fundamental frequency (denoted $f_0$), although $f_0$ need not itself be a member of the set of frequencies associated with any particular wavelength.

The choice of $f_0$ is discussed in more detail at various points in the sequel and is basically influenced by the number of wavelengths sharing the same fiber, by the number of frequencies in each set of assigned frequencies, by what is considered to be a convenient FFT size (e.g., a power of 2), and by the range of possible sampling rates at the receiver.

Figure 2:
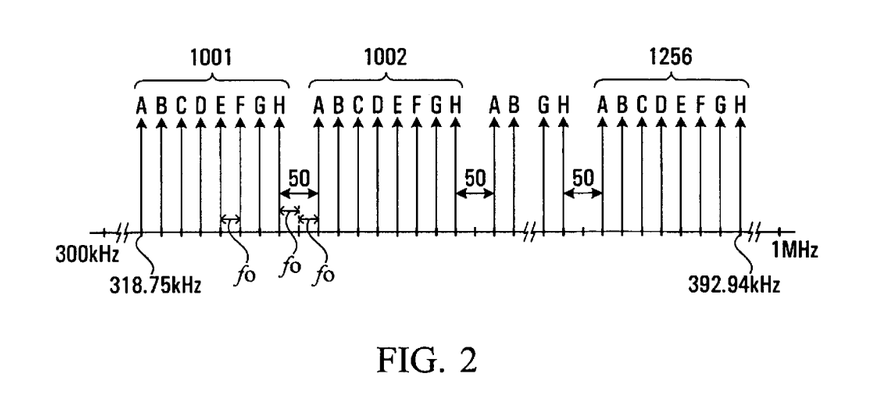
FIG. 2 is a frequency plan for multiple orthogonal frequency-shift-keyed (FSK) overhead signals associated with respective optical wavelengths, according to a specific embodiment of the present invention.

By way of example, a suitable frequency plan for 256 wavelength channels is shown in FIG. 2, where there are taken to be 256 different frequency sets 1001, 1002, . . . , 1256, each containing 8 individual frequencies A, B, C, D, E, F, G, H. The frequencies in each set could be evenly spaced as shown, although they are only actually required to be spaced by integer multiples of $f_0$.

As shown, the sets of frequencies 1001, 1002, . . . , 1256 can be contiguous and each adjacent pair of frequency sets is separated by a guard band 50. In order to preserve the harmonic relationship requirement of the frequencies in each set, the guard bands 50 should each have a width that is a multiple of the fundamental frequency $f_0$. In this particular case, the width of all guard bands 50 has been chosen to be equal to twice the fundamental frequency $f_0$. Hence, in this example, the lowest frequencies of any two adjacent channels a are separated by nine times the fundamental frequency $f_0$. It should be understood that guard bands are not required, in which case the sets of frequencies need not be contiguous (e.g., they may be interleaved).

In the example of FIG. 2, the fundamental frequency $f_0$ has been chosen as 32.2265625 Hz, the first set of frequencies begins at 318.75 kHz, and the last set of frequencies ends at 392.94 kHz. In this particular example, therefore, the total frequency span is equal to 74.19 kHz. In general, the lowest frequency (A) in the lowest set of frequencies (1001) should be sufficiently high to avoid small signal losses due cascaded erbium-doped fiber amplifiers (EDFAs), while the highest frequency (H) in the highest set of frequencies (1256) should be sufficiently low to avoid complexity issues at the receiver side. To meet these requirements, a suitable total frequency span will desirably occupy a subset of the 300 kHz to 1 MHz range, although other ranges are possible.

Because of the required harmonic relationship of the frequencies in each set to the fundamental frequency $f_0$, selection of the total frequency span and the number of frequency sets has a direct impact on the fundamental frequency $f_0$ and vice versa. Ideally, for reasons of spectral efficiency, the fundamental frequency $f_0$ should be low enough such that the corresponding total frequency span is in a desirable range, e.g., 300 kHz to 1 MHz. The actual choice of $f_0$ within these boundaries will affect the sampling rate (denoted $f_R$) which must be used at a receiver and will therefore depend on receiver requirements as described in further detail later on.

Generation and detection of dithered optical signals is now described. Those skilled in the art will appreciate that multiple dithered optical signals sharing the same optical fiber are usually generated at different source points in the optical network. Therefore, there exist the separate problems of (a) generating a single dithered optical signal at a source network element and (b) processing multiple dithered optical signals at a downstream (intermediate) network element. A system for generation of a single dithered optical signal will now be described with reference to FIG. 3 and a system for processing multiple dithered optical signals will be described later on with reference to FIGS. 4 and 5.

Figure 3:
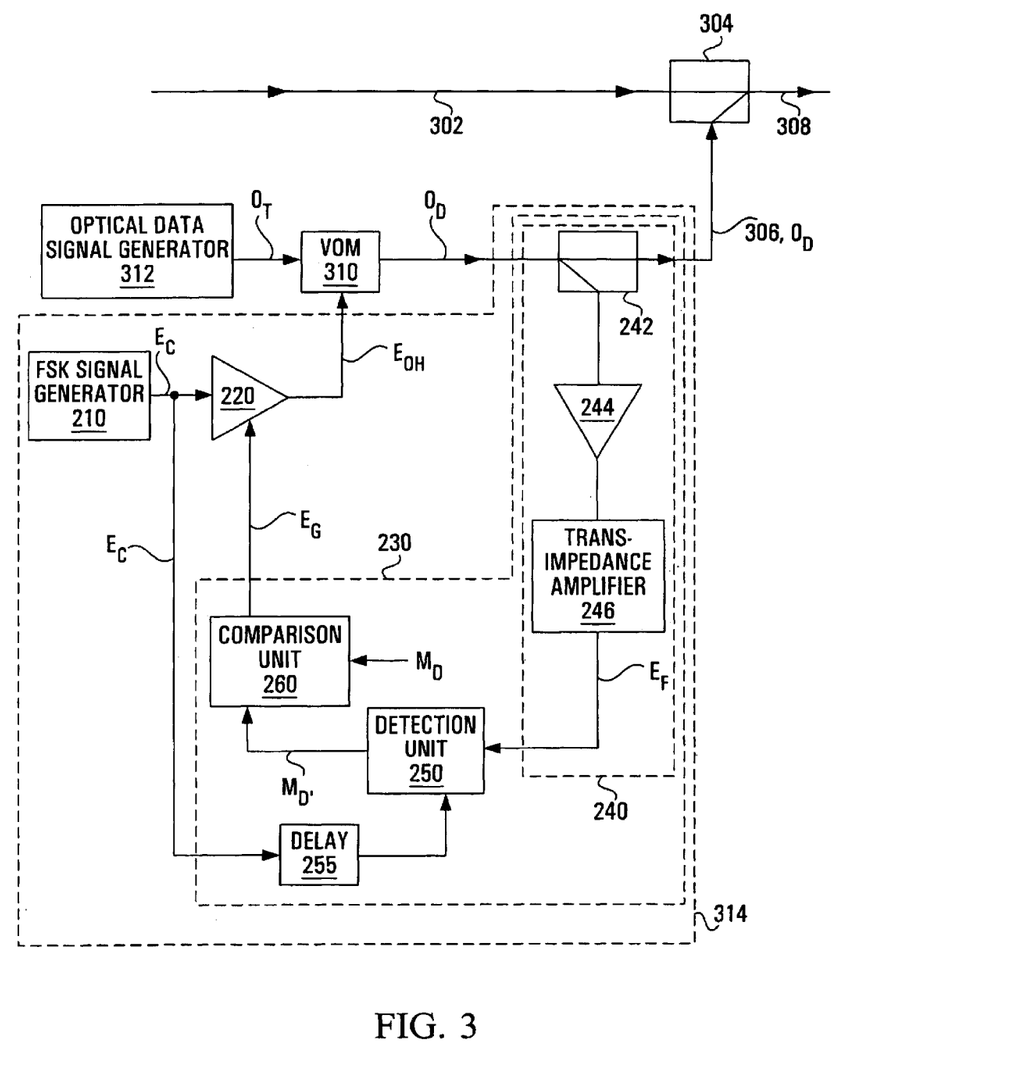
FIG. 3 is a block diagram of a system used for generating a single dithered optical signal in accordance with a specific embodiment of the invention.

With reference to FIG. 3, therefore, there is shown a system for generating a dithered optical signal (denoted $O_D$) on a tributary optical fiber 306 and for coupling, at a coupler 304, the dithered optical signal $O_D$ to a main optical signal arriving on an input optical fiber 302. The dithered optical signal $O_D$ occupies a wavelength of interest, while the main optical signal on the input optical fiber 302 consists of optical signal content on zero or more wavelengths with no optical signal content on the wavelength of interest.

The dithered optical signal $O_D$ on the tributary optical fiber 306 is generated by a system comprising a variable optical modulator (VOM) 310, an optical data signal generator 312 and a control module 314. Specifically, the dithered optical signal $O_D$ is generated by the variable optical modulator 310, which modulates an optical data signal (denoted $O_T$) received from the optical data signal generator 312 as a function of an electrical overhead signal (denoted $E_{OH}$) received from the control module 314.

The system of FIG. 3 could be located at a network element such as a switch or add/drop mux/demux (ADM). The optical data signal generator 312 generically represents a source of optical data, which may originate locally or which may have arrived along an arbitrary direction from another network element.

According to a specific embodiment of the invention, the electrical overhead signal $E_{OH}$ produced by the control module 314 causes the dithered optical signal $O_D$ produced by the VOM 310 to have the characteristics previously described with reference to FIGS. 1 and 2. That is to say, the resulting dithered optical signal $O_D$ has a modulation depth that is related to the average intensity of the optical data signal $O_T$, while the overhead signal $E_{OH}$ itself has frequency variations that provide frequency diversity. One way of providing frequency diversity is to encode connectivity information into the frequency variations of the overhead signal $E_{OH}$.

Also according to a specific embodiment of the invention, the possible frequencies of the overhead signal $E_{OH}$ are uniquely associated with the wavelength of the optical data signal $O_T$ so that knowledge of the wavelength of the dithered optical signal carrying a particular overhead signal will not be required when detecting and decoding that overhead signal at a receiver located further downstream.

In order for the dithered optical signal $O_D$ to possess these desired characteristics, the control module 314 desirably utilizes an FSK signal generator 210 or some similarly suitable generation means for generating an electrical control signal (denoted $E_C$) which exhibits frequency variations. These frequency variations may encode connectivity information. In either case, the frequency of the control signal $E_C$ at any given instant belongs to a set of frequencies that is uniquely associated with the wavelength of the optical data signal $O_T$.

The FSK signal generator 210 is connected to a controllable gain amplifier 220, which generates the overhead signal $E_{OH}$ by amplifying the control signal $E_C$ in accordance with an electrical gain control signal (denoted $E_G$) received from a dither processing module 230.

The value of the gain control signal $E_G$ is controlled by the dither processing module 230 so that the resulting overhead signal $E_{OH}$ produced by the amplifier 220 is at the appropriate amplitude, resulting in a known (or "reference") modulation depth (denoted $M_D$) of the dithered optical signal $O_D$ at the output of the VOM 310.

To this end, the dither processing module 230 is made up of a feedback path 240, a detection unit 250 and a comparison unit 260. The feedback path 240 is connected between the output of the VOM 310 and an input of the detection unit 250. The feedback path 240 comprises an optical tap coupler 242, a photodiode 244 and a trans-impedance amplifier 246. The optical tap coupler 242 taps a portion of the optical power of the dithered optical signal $O_D$. The photodiode 244 converts the tapped optical signal to a photocurrent which is then converted to a voltage by the trans-impedance amplifier 246.

The trans-impedance amplifier 246 thus supplies an input of the detection unit 250 with a feedback signal (denoted $E_F$), which is an electrical version of the dithered optical signal $O_D$. Thus, the feedback signal $E_F$ has an overhead portion which closely matches the low rate FSK overhead signal $E_{OH}$. However, the remainder of the feedback signal $E_F$ does not necessarily accurately represent the variations in the optical data signal $O_T$ because the coupler 242, photodiode 244 and/or the trans-impedance amplifier 246 may be bandwidth-limited components. Nevertheless, it is usually the case that the feedback signal $E_F$ does have a DC voltage which is representative of the average intensity of the optical data signal $O_T$.

The detection unit 250 comprises circuitry, control logic or software for (a) determining the RMS value of the overhead portion of the feedback signal $E_F$; (b) determining the DC voltage of the feedback signal $E_F$; and (c) computing the quotient of the two results in order to obtain a modulation depth estimate (denoted $M_{D'}$).

In order to determine the RMS value of the overhead portion of the feedback signal $E_F$, the detection unit 250 performs a correlation between the feedback signal $E_F$ and all possible frequencies of the electrical control signal $E_C$. To this end, the detection unit 250 may comprise an analog-to-digital converter (ADC), a plurality of time-domain correlators, a peak detector and various digital or analog low-pass filters. The complexity requirements of the detection unit 250 are relatively low because the feedback signal $E_F$ contains a single overhead signal having a limited number of frequency possibilities.

Improved correlation accuracy and further reduced complexity can be realized through synchronous correlation of the feedback signal $E_F$ with the control signal $E_C$. This can be achieved by providing a delayed replica of the control signal $E_C$ from the output of the FSK signal generator 210 via a delay element 255. If used, the delay element 255 should introduce a delay that is approximately equal to the delay through the amplifier 220, the VOM 310, the splitter 242, the photodiode 244 and the trans-impedance amplifier 246.

In order to determine the DC voltage of the feedback signal $E_F$, the detection unit 250 may comprise a simple capacitor or resistive-capacitive network. In order to determine the quotient of the two RMS value of the dither signal and the DC voltage of the feedback signal, thereby obtaining the modulation depth estimate $M_{D'}$, the detection unit 250 may comprise a digital division module or other suitable circuitry, software and/or control logic.

The output of the detection unit 250 is thus the modulation depth estimate $M_{D'}$ which is fed to the comparison unit 260. The comparison unit 260 comprises circuitry, control logic or software for comparing the received modulation depth estimate $M_{D'}$ to the reference modulation depth $M_D$. The output of the comparison unit 260 is scaled and used to modify the electrical gain control signal $E_G$ which is fed to the amplifier 220.

In operation, the control signal $E_C$ is generated by the FSK signal generator 210 and, by virtue of its frequency variations and content, the control signal $E_C$ may encode connectivity information. The control signal $E_C$ is amplified by the amplifier 220 and emerges as the overhead signal $E_{OH}$. The overhead signal $E_{OH}$ then modulates the intensity of the optical data signal $O_T$, resulting in the dithered optical signal $O_D$.

The dithered optical signal $O_D$ is tapped by the coupler 242 and subsequently converted into the feedback signal $E_F$ by the photodiode 244 and the trans-impedance amplifier 246. The detector unit 250 correlates the feedback signal $E_F$ with a (delayed) version of the control signal $E_C$ in order to determine the RMS value of the overhead portion of the feedback signal $E_F$. The DC voltage of the feedback signal $E_F$ is obtained at a capacitor output and remains unaffected by variations due to the overhead portion of the feedback signal $E_F$.

The detector unit 250 divides the RMS value of the overhead portion of the feedback signal $E_F$ by the average DC voltage of the feedback signal $E_F$ to obtain the modulation depth estimate $M_{D'}$. The comparison unit 260 then adjusts the gain control signal $E_G$ as a function of the difference between the modulation depth estimate $M_{D'}$ and the reference modulation depth $M_D$. (The modulation depth estimate $M_{D'}$ may be different from the reference modulation depth $M_D$ due to temperature fluctuations, for example.)

It should be appreciated that convergence of the feedback loop in the control unit 314 is attained when the modulation depth estimate $M_{D'}$ is substantially equal to the reference modulation depth $M_D$. In this way, it is ensured that the dithered optical signal $O_D$ has been modulated at the appropriate modulation depth $M_D$ by the overhead signal $E_{OH}$.

By virtue of being coupled by the coupler 304, the dithered optical signal $O_D$ occupying the wavelength of interest shares the output optical fiber 308 with other optical signals on other wavelengths. It is envisaged that these other signals may also be dithered optical signals which have been modulated by respective overhead signals that are also FSK signals. If this is indeed the case, then the FSK signals associated with different wavelengths should have the characteristics described earlier with reference to FIGS. 1 and 2.

While traveling through a portion of the network, a multi-wavelength optical signal suffers wavelength-dependent losses introduced by the optical medium itself and by various intervening cascades of erbium-doped fiber amplifiers. These losses affect the intensity of each dithered optical signal to a degree which may depend on the wavelength. However, for a given dithered optical signal, the corresponding overhead signal and the corresponding optical data signal are affected in the same way. Therefore, the ratio of the RMS value of the overhead signal to the average intensity of the optical data signal remains constant. In other words, the modulation depth of each dithered optical data signal remains unchanged, despite attenuation of the dithered optical signal.

Hence, by measuring the RMS value of each overhead signal, an intermediate network element can infer the average intensity of the corresponding optical data signal. It may also be of interest for the intermediate network element to decode connectivity information associated with one or more optical wavelengths. It would be highly desirable to perform these tasks without having to provide optical demultiplexing circuitry at the intermediate network element. Furthermore, it would be desirable to perform these tasks with reasonably low computational complexity.

Figure 4:
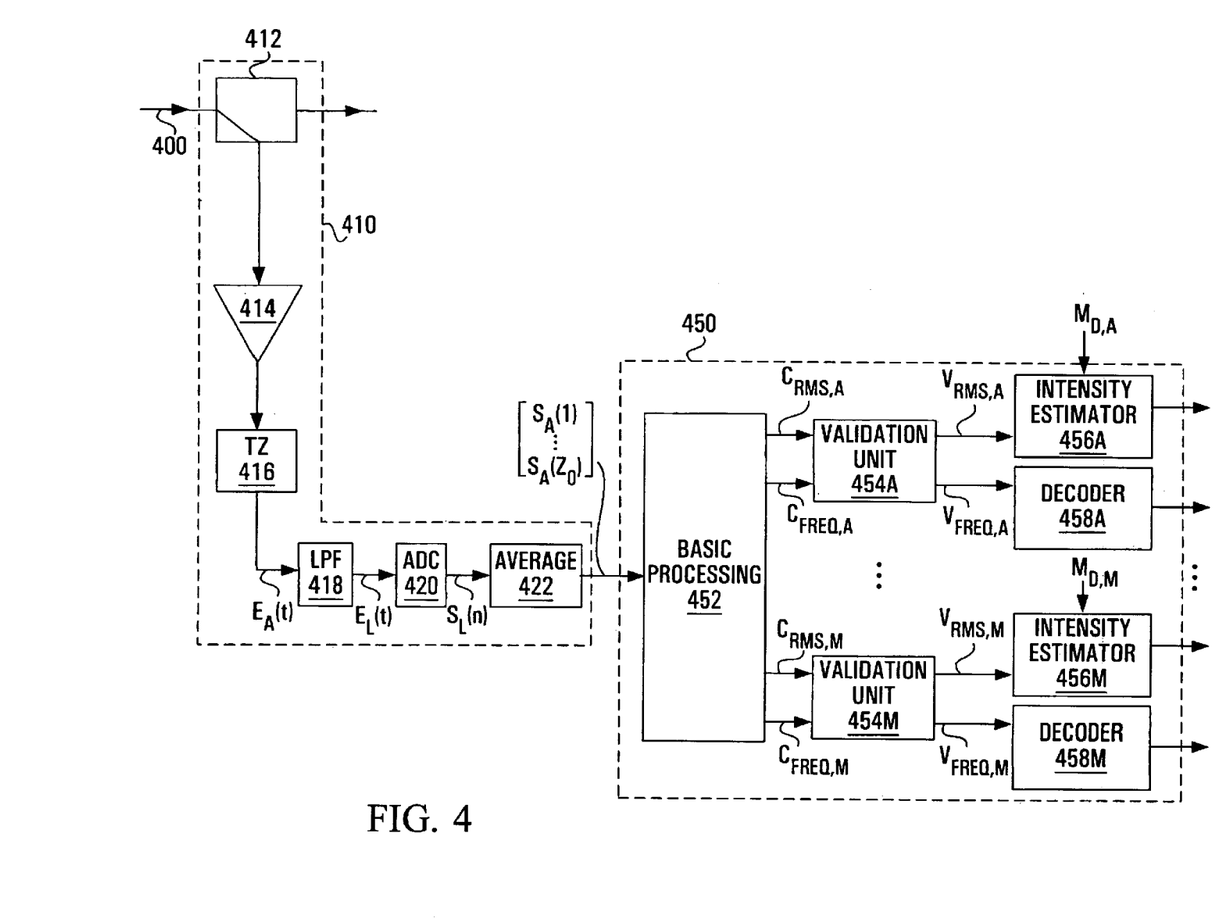
FIG. 4 is a block diagram of a system used for processing a multi-wavelength signal containing multiple dithered optical signals.

To this end, FIG. 4 shows a system for estimating the average intensity of one or more optical data signals occupying respective wavelengths of an incoming multi-wavelength optical signal arriving on an optical fiber 400. The system may also be used for decoding connectivity information associated with each of these wavelengths.

It is assumed that each individual wavelength in the incoming multi-wavelength optical signal is occupied by a dithered optical signal that has been modulated with an FSK overhead signal using a system such as that shown in FIG. 3. Also, it is assumed that the modulation scheme used for multiple wavelengths is orthogonal as previously described with reference to FIGS. 1 and 2, where the instantaneous frequency of each overhead signal belongs to a distinct set of frequencies and is harmonically related to a common fundamental frequency $f_0$.

The system in FIG. 4 comprises a data acquisition section 410 connected to a processing section 450. The data acquisition section 410 comprises an optical splitter 412 which intercepts the optical fiber 400 that carries the incoming multi-wavelength optical signal. The splitter 412 is connected in series to other components in the data acquisition section 410, including a photodiode 414, a trans-impedance amplifier 416, a low-pass filter 418, an analog-to-digital converter 420 and an averaging unit 422.

The photodiode 414 and the trans-impedance amplifier 416 can be of standard design; these components provide the low-pass filter 418 with an electrical signal (denoted $E_A(t)$) that is representative of the aggregate light present on the optical fiber.

Because it is only necessary to detect and decode the individual overhead signals (which have a low bandwidth in comparison with the optical data signals), it is desirable to filter out high-speed variations of the electrical signal $E_A(t)$. This is achieved by the low-pass filter 418, which can be of standard design. The low-pass filter 418 ensures that the electrical signal (denoted $E_L(t)$) at its output contains just the aggregate of the low-frequency overhead signals present on the multiple wavelengths.

Because the overhead signals are desirably limited to between 300 kHz and 1 MHz, the low-pass filter 418 can accordingly be band limited to below 1 MHz. Those skilled in the art will appreciate that the low-pass filter 418 could also be a band-pass filter with a pass band in the range of 300 kHz to 1 MHz. In any event, the filter used should have at least as wide a bandwidth as the aggregate overhead signal while filtering out variations due to high speed data.

The analog-to-digital converter (ADC) 420 can also be of standard design and comprises circuitry for sampling the signal $E_L(t)$ received from the low-pass filter 418 at a sampling rate (denoted $f_R$) to produce a sample stream (denoted $S_L(n)$) at its output. Because $E_L(t)$ is a band limited signal, the sampling rate $f_R$ can actually be below the so-called Nyquist rate. This technique is known as "band-pass sampling" and requires that:

(a) $f_R$ is at least as high as, but desirably higher than, twice the total frequency span of the signal $E_L(t)$; and (b) $f_R$ is less than twice the minimum frequency of the signal $E_L(t)$.

In the above described example of FIG. 2, wherein the allowable frequencies of the overhead signals spanned from 318.75 kHz to 392.94 kHz and wherein $f_0$ was set to 32.2265625 Hz, requirements (a) and (b) restrict the value for the sampling rate $f_R$ to between 148.38 kilosamples per second (ksps) and 637.5 ksps.

In addition, it has already been mentioned that the choice of the fundamental frequency $f_0$ will dictate the choice of the sampling rate $f_R$. In a specific sense, $f_R$ should be chosen such that:

(c) $_2N$ samples are produced in $T_0$ seconds, for an integer N, where $T_0$ is the inverse of the fundamental frequency $f_0$; and (d) it is a multiple of the fundamental frequency $f_0$.

Requirement (c) facilitates execution of a subsequent fast Fourier transform (FFT) in the processing section 450, while requirement (d) ensures that the frequency points of this ensuing FFT will fall exactly at the frequencies chosen for the overhead signals. In the above example of FIG. 2, requirements (c) and (d) further restrict the sampling rate to either 528,000 samples per second (for an FFT size of 16,384) or 264,000 samples per second (for an FFT size of 8192).

It should therefore be apparent that there is interplay between the sampling rate $f_R$ and the fundamental frequency $f_0$. In particular, the choice of the fundamental frequency $f_0$ directly impacts the choice of the sampling rate $f_R$ (and vice versa), just as selection of the fundamental frequency $f_0$ had a direct impact on the choice of the total frequency span and the number of frequencies in each frequency set (and vice versa).

Considering now the averaging unit 422, this component comprises circuitry, software or control logic for buffering the sample stream $S_L(n)$ exiting the ADC 420 for the duration of an acquisition interval of $T_{acq}$ seconds. The number of samples buffered during this acquisition interval of length $T_{acq}$ seconds is denoted $Z_{TOTAL}$ and is equal to $Z_0 \times Y$, where:

$Z_0$ is the number of samples arriving per fundamental period of $T_0$ seconds (recalling that $T_0=1/f_0$); and Y is an integer greater than or equal to 1, representing the number of "blocks" per acquisition interval of $T_{acq}$ seconds.

The averaging unit 422 also comprises circuitry, software and/or control logic for performing a windowing operation on the set of $Z_{TOTAL}$ samples buffered during $T_{acq}$ seconds. In addition, the averaging unit 422 also comprises suitable circuitry, software and/or control logic for separating the windowed set of $Z_{TOTAL}$ samples into Y blocks of $Z_0$ samples and for averaging the blocks on an element-by-element basis. This produces an output block of $Z_0$ windowed and averaged samples, conveniently denoted in matrix form by $[S_A(1) \ldots S_A(Z_0)]$.

Thus, the output of the averaging unit 422 is a block of averaged samples $[S_A(1) \ldots S_A(Z_0)]$, one such block being produced every $T_{acq}$ seconds. It should be apparent from the above that the elements of this block of averaged samples $[S_A(1) \ldots S_A(Z_0)]$ are samples corresponding to a windowed, periodically averaged version of the aggregate overhead signal formed from the individual overhead signals associated with the various wavelengths in the incoming multi-wavelength optical signal arriving on the optical fiber 400. It should also be apparent that $Z_0$ will be a power of two by virtue of having chosen the sampling rate $f_R$ to result in the production of $2^N$ samples in $T_0$ seconds for some integer N.

The averaging unit 422 feeds the block of averaged samples $[S_A(1) \ldots S_A(Z_0)]$ to a basic processing unit 452 located at the front of the processing section 450. In addition to comprising the basic processing unit 452, the processing section 450 also comprises a plurality (M) of validation units 454$_A$–454$_M$ connected to the basic processing unit 452. Connected to each validation unit is a respective one of a plurality of intensity estimators 456$_A$–456$_M$ and a respective one of a plurality of decoders 458$_A$–458$_M$. M could equal 256 in a specific embodiment consistent with the 256 frequency sets 1001–1256 represented in FIG. 2.

The basic processing unit 452 comprises circuitry, software and/or control logic for extracting and determining the frequency content of each individual overhead signal contained in the block of averaged samples $[S_A(1) \ldots S_A(Z_0)]$. Of particular interest are the RMS value and the instantaneous frequency of each overhead signal as derived from the block of averaged samples $[S_A(1) \ldots S_A(Z_0)]$. This is because each overhead signal consists of a tone whose instantaneous frequency of the tone belongs to a restricted set of frequencies and changes with time to provide frequency diversity and, possibly, to convey control information. Also, each overhead signal (tone) has an associated RMS value that is intended to be used by the receiver in FIG. 4 for estimating the average optical intensity of the corresponding optical data signal.

Now, it should be appreciated that the occurrence of a change in the instantaneous frequency content of an overhead signal is unpredictable from the point of view of the processing section 450. In fact, it is not unlikely that during the last $T_{acq}$ seconds in which an averaging operation was performed to produce the $Z_0$ averaged samples $[S_A(1) \ldots S_A(Z_0)]$ arriving at the basic processing unit 452, there will have been an instantaneous frequency change for one or more of the overhead signals. In such a "transitional" case, any attempt to estimate the instantaneous frequency of an affected overhead signal, as well as the RMS value of that overhead signal at that frequency, will be flawed.

To resolve this issue (and as will be described in further detail later on with reference to FIG. 5), the basic processing unit 452 produces, for each overhead signal associated with a respective optical wavelength, a respective one of a plurality of "candidate" RMS values (denoted $C_{RMS,A}, \ldots, C_{RMS,M}$) and a respective one of a plurality of "candidate" frequencies (denoted $C_{FREQ,A}, \ldots, C_{FREQ,M}$). For each overhead signal, these two respective outputs are fed along one or more control links to the respective one of the validation units 454$_A$–454$_M$.

Each validation units 454$_i$, $i \in \{A, B, \ldots, M\}$ comprises circuitry, software or control logic for processing the candidate RMS value $C_{RMS,i}$ and the candidate frequency $C_{FREQ,i}$ associated with the respective overhead signal in order to determine whether a transition has occurred in the last $T_{acq}$ seconds. If so, the validation unit in question labels the corresponding candidate frequency and its associated RMS value as being invalid.

In one specific embodiment, the operation performed by each of the validation units 454$_A$–454$_M$ may consist of determining whether the candidate RMS value associated with the respective overhead signal is above a certain predetermined threshold. If not, it is concluded that a transition is under way and that the candidate RMS value and the corresponding candidate frequency are invalid. Of course, care should be taken to set the threshold to a value that is sufficiently low to allow for a wide dynamic range of the overhead signal. In other words, if the threshold value is set too high, a particular validation unit may consistently conclude that the candidate RMS value is too low to be valid, whereas the low value may in actuality be caused by severe, temporary, but possibly non-critical loss conditions on the fiber.

It is noted that because $T_{acq}$ is much smaller than the time during which the frequency content of an overhead signal remains constant (e.g., on the order of 1.5 seconds), an invalid version of the candidate frequency and candidate RMS value will usually be followed by one or more valid versions of the candidate frequency and candidate RMS value. When a valid candidate frequency and candidate RMS value has eventually been found, the validation unit in question (say, $454_p$) will send a "valid RMS value" (denoted $V_{RMS,p}$) to its intensity estimator $456_p$ along one control line and a "valid frequency" (denoted $V_{FREQ,p}$) to the decoder $458_p$ along another control line.

Each of the intensity estimators $456_A$–$456_M$ comprises circuitry, software or control logic for dividing the valid RMS value of each overhead signal by the respective reference modulation depth $M_{D,A}$–$M_{D,M}$ associated with that optical wavelength, thus arriving at an estimate of the average intensity of the optical data signal carried on the corresponding optical wavelength. The optical intensity determined in this manner can subsequently be processed by a controller (not shown), which may take action such as to increase the gain or initiate protection switching if the computed intensity is found to be less than a pre-determined nominal value.

Regarding the decoders $458_A$–$458_M$, each such component comprises circuitry, software and/or control logic for extracting the control information, if any, encoded by the instantaneous frequency as well as the frequency variations of the respective overhead signal. Such information can include connectivity information and could be provided to a controller at the receiver, which may take switching action based upon the decoded connectivity information.

Figure 5:
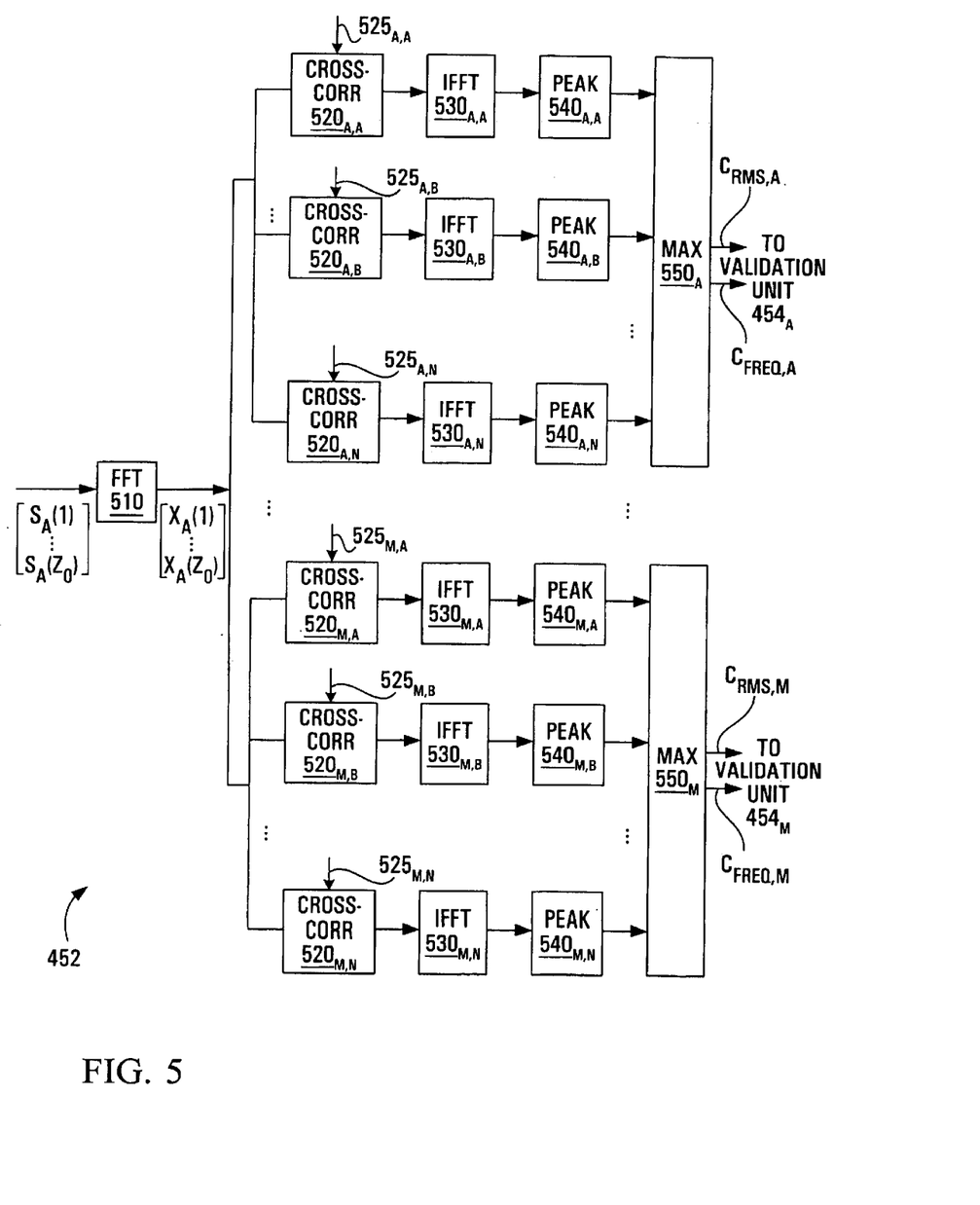
FIG. 5 is a functional block diagram illustrating operation of the basic processing unit in FIG. 4.

Reference is once again made to the basic processing unit 452 in FIG. 4, operation of which is now described in greater detail with additional reference to FIG. 5, wherein is shown a functional block diagram illustrating the operational steps executed by the basic processing unit 452 when processing a block of $Z_0$ averaged samples $[S_A(1) \ldots S_A(Z_0)]$ received from the averaging unit 422 at intervals of $T_{acq}$ seconds. It should be understood that the functional elements shown in FIG. 5 could be implemented in hardware, software, firmware or any combination thereof.

At a fundamental level, the basic processing unit 452 shown in FIG. 5 implements matched filter detection in the frequency domain which gives superior performance in terms of noise removal. To this end, the first step is the provision of a fast Fourier transform (FFT) functional element 510 at the input to the basic processing unit 452. The FFT functional element 510 performs an FFT of suitable size on the block of $Z_0$ averaged samples $[S_A(1) \ldots S_A(Z_0)]$, received once every $T_{acq}$ seconds. The result of the FFT yields a spectrum vector denoted $[X_A(1) \ldots X_A(Z_0)]$, which shows the spectral content at each of $Z_0$ evenly spaced frequencies.

The execution of a fast Fourier transform is simplified by virtue of having made $Z_0$ a power of two through proper selection of the sampling rate $f_R$ and the fundamental frequency $f_0$. In the specific examples described above, fundamental frequency $f_0$ was chosen to equal 32.2265625 Hz and a suitable sampling rate was found to be either 528,000 samples per second (for $Z_0$=16,384) or 264,000 samples per second (for $Z_0$=8192).

It is at this point that the rationale behind requiring that a harmonic relationship be maintained between the fundamental frequency $f_0$ and each of the possible frequencies of each overhead signal as well as the sampling rate $f_R$ becomes clear. In particular, it becomes clear that by executing a single FFT (in this case a 16-K FFT or an 8-K FFT), the discrete frequency points of the resulting spectrum vector $[X_A(1) \ldots X_A(Z_0)]$ will correspond exactly to the collection of possible frequencies for all the overhead signals.

Continuing with the functional description of the basic processing unit 452, each of a plurality of correlators $520_{i,j}$, $i \in \{A, B, \ldots, M\}$, $j \in \{A, B, \ldots, N\}$, performs a frequency domain cross-correlation between the spectrum vector $[X_A(1) \ldots X_A(Z_0)]$ and a respective one of a plurality of spectral templates $520_{i,j}$, $i \in \{A, B, \ldots, M\}$, $j \in \{A, B, \ldots, N\}$. In this case, M is still the number of overhead signals (i.e., the number of frequency sets in the spectrum), while N is the number of frequencies per set. It should be appreciated that N may be different for each overhead signal but is in this case assumed to be constant in the interest of clarity. In the specific example described in FIG. 2, M would equal 256 and N would equal 8.

Each of the spectral templates $525_{i,j}$ can be a sparse vector having a "one" at a single frequency point of interest and a "zero" elsewhere. Each correlator $520_{i,j}$ may therefore perform an element-by-element multiplication of the spectrum vector $[X_A(1) \ldots X_A(Z_0)]$ with the corresponding spectral template $525_{i,j}$, to yield a sparse vector having zeroes at all frequencies except for the frequency of the corresponding spectral template, where the value of the sparse vector at that frequency is the value of the spectrum vector $[X_A(1) \ldots X_A(Z_0)]$ at that frequency.

Next, a plurality of inverse FFT (IFFT) functional elements $530_{i,j}$ performs short IFFTs on the output of the respective correlator $520_{i,j}$. To conserve computational resources, the length of each IFFT so performed is desirably much shorter than the length of the FFT performed by the FFT functional element 510. Those skilled in the art will have little difficulty implementing a functional element which performs a short IFFT on a longer input vector.

Because the input to each IFFT functional element $530_{i,j}$ is a sparse vector with at most one non-zero element, the output of each IFFT functional element 530 consists of either zeroes or samples of a time domain sinusoid (tone) at the template frequency. The result of the IFFT performed by each of the IFFT functional elements $530_{i,j}$ is thus passed through a respective one of a plurality of peak detectors $540_{i,j}$ in order to determine the amplitude of the resulting time-domain signal. It should be appreciated that during a change in the instantaneous frequency of an overhead signal, two or more peak detectors associated with that overhead signal may produce sinusoids of comparable amplitude.

Thus, the output of each of the peak detectors $540_{i,j}$ for a common optical wavelength, i.e., for a common value of i, is fed to one of a plurality of maximum selectors $550_A$–$550_M$. Each of the maximum selectors $550_A$–$550_M$ is operable to identify the frequency of the tone which has the highest amplitude and to compute the RMS value of that tone. Since the relationship between RMS and peak values for a sinusoid is well known, each of the maximum detectors $550_A$–$550_M$ may simply convert the output of the one peak detector generating the highest peak value to an RMS value.

The frequency at which the maximum selector associated with the overhead signal on a particular optical wavelength (say, maximum selector $550_p$) has identified the maximum amplitude is output to the corresponding validation unit $454_p$ as the previously described candidate frequency $C_{FREQ,p}$ for that overhead signal while the actual peak value (converted to an RMS value) is provided to validation unit $454_p$ as the previously described candidate RMS value $C_{RMS,p}$. Each of the validation units $454_A$–$454_M$ then proceeds as previously described.

Other implementation options include using a different size of FFT, using a different size of IFFT, using different methods of cross-correlation, each of which may be associated with its own trade-off in terms of performance accuracy versus computational complexity. Other options include simplifying the maximum detection process by providing a simple software algorithm to run through the results of the FFT functional element 510 and isolate, for each of the M sets of frequencies, the frequency point (and the corresponding FFT value) having the largest FFT value from among the frequency points in the set.

Having considered the operation of the basic processing unit 452 with reference to FIG. 5, one of the main advantages of the invention should become clear. Specifically, because an FFT of length $Z_0$ (=$T_0 \times f_R$) is performed, this will produce points at frequencies that are spaced apart equally by $f_0$ hertz. Because of the required harmonic relationship among all possible frequencies of all the overhead signals, the frequencies at which it is required to measure the RMS value fall exactly the frequency points provided by the FFT. Of course, small deviations which do not substantially affect the measurement accuracy are permissible.

Moreover, it should be appreciated that a high degree of accuracy in RMS estimation can be attained by performing a single FFT of manageable size (e.g., of length 16,384 or 8,192) every $T_{acq}$ seconds. The complexity of the system is further kept in check since the IFFTs performed by the IFFT functional elements $530_{i,j}$ are much shorter than the FFT performed by the FFT functional element $510_{i,j}$.

The invention also provides improved performance as a result of the specially selected frequency range of the overhead signals, which contains frequencies sufficiently high to be immune to the small-signal response of cascaded EDFA amplifiers and sufficiently low to allow low complexity at the intermediate network element where detection is required. Moreover, the fact that the overhead signals are FSK signals with frequency content that is dynamic renders the overhead signals immune to periodic interference which may arise from the transmission of frame-based optical data signals.

Of course, there are other alternative configurations which belong within the scope of the invention. For example, it should be understood that the cross-correlation and IFFT operations performed subsequent to the long 16K FFT could be executed in sequence rather than in parallel. Moreover, each overhead signal has been described as occupying only one frequency at a time, but it is possible (although less energy efficient) to attain frequency diversity and convey control information by allowing an overhead signal to occupy more than one frequency at any given instant.

Furthermore, although the above description has dealt primarily with multi-wavelength optical signals, those skilled in the art should appreciate that the invention can be applied to the generation and reception of an optical signal occupying a single carrier wavelength in the optical spectrum. In such a case, there will be only one set of frequencies associated with the overhead signal (referring to FIG. 2) and the frequencies in that set will be harmonically related to a common fundamental frequency in the above described manner.

The overhead signal will then occupy one (or possibly more) of these frequencies at a time and the actual instantaneous frequency will vary with time in order to provide frequency diversity. The time variations could be used as a control channel to transmit control information.

The fact that frequency diversity is provided allows the system to combat interference such as periodic interference due to framing of the underlying optical data signal. The fact that the frequencies in the set are harmonically related allow the receiver system to achieve good RMS measurement accuracy at a relatively low computational complexity through a suitable choice of a sampling rate and FFT size, because each possible frequency in the overhead signal can be made to fall at the center of a frequency bin of the resulting FFT.

While specific embodiments of the present invention have been described and illustrated, it will be apparent to those skilled in the art that numerous further modifications and variations can be made without departing from the scope of the invention as defined in the appended claims.

We claim:

1. A method of generating a dithered optical signal, comprising:

intensity modulating an optical carrier modulated data signal in accordance with an overhead signal to produce the dithered optical signal, wherein the overhead signal has an instantaneous frequency content which is time-varying and is uniquely associated with the optical wavelength of the carrier, wherein the instantaneous frequency content is selected from a set of frequencies which are harmonically related to a common fundamental frequency;

measuring a modulation depth of the dithered optical signal; and adjusting the amplitude of the overhead signal as a function of the measured modulation depth.

2. A method as claimed in claim 1, wherein the step of adjusting comprises adjusting the amplitude of the overhead signal if it is not substantially equal to a pre-determined value.

3. A method as claimed in claim 1, wherein the instantaneous frequency content of the overhead signal encodes control information.

4. A method as claimed in claim 3, wherein the overhead signal is a frequency-shift keyed signal.

5. A method as claimed in claim 4, wherein the instantaneous frequency content of the overhead signal changes no faster than once every 1.5 seconds.

6. A method as claimed in claim 1, where the step of measuring comprises:

tapping a portion of the dithered optical signal;

converting the tapped portion into an electrical signal;

measuring a DC value of the electrical signal;

detecting the presence of the overhead signal in the electrical signal;

measuring an RMS value of the extracted version; and dividing said RMS value by said DC value to obtain the measured modulation depth.

7. A method as claimed in claim 6, where the step of detecting comprises correlating the electrical signal with a delayed version of the overhead signal.

8. A system for generating a dithered optical signal, comprising:

a signal generator for generating an overhead signal having an instantaneous frequency content which is time-varying, wherein the instantaneous frequency content is selected from a set of frequencies which are harmonically related to a common fundamental frequency;

an amplifier connected to the signal generator, for controllably varying the amplitude of the overhead signal in accordance with a gain control signal;

an optical modulator connected to the amplifier, for intensity modulating a carrier modulated optical data signal in accordance with the overhead signal to produce the dithered optical signal;

a feedback path connected to the optical modulator, for capturing a portion of the dithered optical signal;

a measurement unit connected to the feedback path, for measuring a modulation depth of the tapped portion; and a comparison unit connected to the detection unit and to the amplifier, for adjusting the gain control signal as a function of the measured modulation depth;

wherein the instantaneous frequency content of the overhead signal is uniquely associated with the optical wavelength of the carrier.

9. A system as claimed in claim 8, wherein the signal generator is operable to encode control information in the frequency variations of the overhead signal.

10. A system as claimed in claim 9, wherein the signal generator is an FSK signal generator.

11. A system as claimed in claim 10, wherein the instantaneous frequency content of the overhead signal changes no faster than once every 1.5 seconds.

12. A system as claimed in claim 8, where the feedback path comprises:

an optical tap coupler for tapping a portion of the dithered optical signal; and an opto-electronic converter for converting the tapped portion of signal into an electrical signal.

13. A system as claimed in claim 12, where the feedback path further comprises a trans-impedance following the opto-electronic converter.

14. A system as claimed in claim 12, where the detection unit is operable to measure a DC value of the electrical signal, to extract a version of the overhead signal from the electrical signal, to measure an RMS value of the extracted overhead signal and to divide said RMS value by said DC value to obtain the measured modulation depth.

15. A system for generating a dithered optical signal, comprising:

means for intensity modulating an optical carrier modulated data signal in accordance with an overhead signal to produce the dithered optical signal, wherein the overhead signal has an instantaneous frequency content which is time-varying and is uniquely associated with the optical wavelength of the carrier, wherein the instantaneous frequency content is selected from a set of frequencies which are harmonically related to a common fundamental frequency;

means, connected to the intensity modulating means, for measuring a modulation depth of the dithered optical signal; and means, connected to the measuring means, for adjusting the amplitude of the overhead signal as a function of the measured modulation depth.

16. A method of generating first and second dithered optical signals, comprising:

intensity modulating a first optical data signal in accordance with a first overhead signal to produce the first dithered optical signal, wherein the first overhead signal has a frequency content which is time-varying and is uniquely associated with the wavelength of the first optical data signal;

measuring a modulation depth of the first overhead signal;

controlling the amplitude of the first overhead signal as a function of the modulation depth of the first dithered optical signal;

intensity modulating a second optical data signal in accordance with a second overhead signal to produce the second dithered optical signal, wherein the second overhead signal has a frequency content which is time-varying and is uniquely associated with the wavelength of the second optical data signal;

measuring a modulation depth of the second overhead signal; and controlling the amplitude of the second overhead signal as a function of the modulation depth of the second dithered optical signal;

wherein the frequency content of the first and second overhead signals is harmonically related to a common fundamental frequency.

17. A method as claimed in claim 16, further comprising optically coupling the first dithered optical signal to the second dithered optical signal.

18. A system for generating a wavelength division multiplexes optical signal, comprising:

at least two optical data signal sources, each operable to generate data signal occupying a respective wavelength channel, at least two overhead signal sources, each operable to generate a respective overhead signal having a frequency content that is a combination of frequency components that are harmonically related to a common fundamental frequency, wherein the frequency content of each overhead signal is distinct from the frequency content of each other overhead signal;

at least two optical modulators, each coupled to a respective optical data signal source and a respective overhead signal source, and operable to modulate the respective optical data signal with the respective overhead signal to produce a respective dithered optical signal;

an optical combiner operable to combine the dithered optical signals; and at least two feedback loops, each feedback loop coupled between a respective optical modulator and a respective overhead signal source, and operable to sense the overhead signal in the respective dithered optical signal and operable to to maintain a predetermined modulation depth of the overhead signal in the dithered optical signal.

19. A system as defined in claim 18, wherein each overhead signal source is operable to change the respective overhead signal between single frequency components selected from a respective set of frequency components that are unique to that overhead signal source such that, at each instant, each overhead signal has an instantaneous frequency content that is a single frequency component at a frequency which is unique to that overhead signal.

20. A system as defined in claim 18, wherein each overhead signal source comprises a respective signal generator and a respective amplitude controller coupled between the respective signal generator and the respective optical modulator and operable in response to a feedback signal from the feedback loop to control the amplitude of the respective overhead signal coupled to the respective optical modulator.

21. A system as defined in claim 20, wherein each respective amplitude controller comprises a respective amplifier.

22. A system as defined in claim 18, wherein said at least two optical data signal sources comprises at least three optical data sources and wherein said at least two overhead signal sources comprises at least three overhead signal sources and wherein said at least two optical modulators comprises at least three optical modulators.

23. A method for generating a wavelength division multiplexed optical signal, comprising steps of:

generating at least two optical data signals, each occupying a respective wavelength channel,     generating at least two overhead signals, each having a frequency content that is a combination of frequency components that are harmonically related to a common fundamental frequency,     wherein the frequency content of each overhead signal is distinct from the frequency content of each other overhead signal; and     modulating each respective optical data signal with a respective overhead signal to produce a respective dithered optical signal;

combining the dithered optical signals; and maintaining a predetermined modulation depth of each overhead signal in the dithered optical signal.

24. A method as defined in claim 23, comprising changing each overhead signal between single frequency components selected from a respective set of frequency components that are unique to that overhead signal such that, at each instant, each overhead signal has an instantaneous frequency content that is a single frequency component at a frequency which is unique to that overhead signal.

25. A method as defined in claim 23, the step of maintaining a predetermined modulation depth of each overhead signal in the dithered optical signal comprises;

sensing each overhead signal in the combined dithered optical signals; and     controlling generation of each overhead signal in response to the respective sensed overhead signal to maintain a predetermined modulation depth of the overhead signal in each dithered optical signal.

26. A method as claimed in claim 23 wherein said step of generation at least two optical data signals comprised generating at least three optical data signals, and wherein said step of generating at least two overhead signals, comprises generating at least three overhead signals.

27. An optical transmission system network, comprising a transmitter which includes the system for generating a wavelength division multiplexed optical signal as claimed is claim 18 and further comprising:

a signal analyzer operable to analyze the wavelength division multiplexed signal to identify frequency components of said overhead signals to identify the frequency components that are harmonically related to the common fundamental frequency; and     transmission equipment operable to connect the transmitter to the signal analyzer, said transmission equipment being operable to carry the wavelength division multiplexed signal from the transmitter to the receiver.

28. An optical transmission system as defined in claim 27, wherein the signal analyzer is operable to perform at least one Fast Fourier Transform to analyze the frequency content of the wavelength division multiplexed signal.

29. An optical transmission system as defined in claim 27, wherein the signal analyzer is operable to estimate an energy measure for at least one frequency component that is harmonically related to the common fundamental frequency and to estimate a signal intensity for one of said optical data signals based on the estimated energy measure.

30. An optical transmission system as defined in claim 27, wherein the transmitter is operable to change each overhead signal between single frequency components selected from a respective set of frequency components that are unique to that overhead signal such that, at each instant, each overhead signal has an instantaneous frequency content that is a single frequency component at a frequency which is unique to that overhead signal.

31. An optical transmission system as defined in claim 27, wherein the signal analyzer uses a sampling rate related to the common fundamental frequency.

\* \* \* \* \*

UNITED STATES PATENT AND TRADEMARK OFFICE
CERTIFICATE OF CORRECTION

PATENT NO.         : 7,197,243 B1
APPLICATION NO. : 09/539706
DATED              : March 27, 2007
INVENTOR(S)        : James Harley et al.

It is certified that error appears in the above-identified patent and that said Letters Patent is hereby corrected as shown below:

Column 17, Claim 8, line 17, delete "detection" and insert therefor -- measurement --;

Column 17, Claim 14, line 40, delete "detection" and insert therefor -- measurement --;

Column 18, Claim 18, lines 27 and 28, delete "multiplexes" and insert therefor -- multiplexed --;

Column 18, Claim 18, line 30, insert -- an optical -- after the word "generate"; and Column 18, Claim 18, line 53, delete the second occurrence of "to".

Signed and Sealed this

Nineteenth Day of June, 2007

JON W. DUDAS
*Director of the United States Patent and Trademark Office*